US008422045B2

(12) United States Patent
Yamada

(10) Patent No.: US 8,422,045 B2
(45) Date of Patent: Apr. 16, 2013

(54) IMAGE FORMING APPARATUS SPECIFYING A FILE TO BE PRINTED FROM FILES STORED IN A STORAGE MEDIUM

(75) Inventor: Akihiro Yamada, Nagoya (JP)

(73) Assignee: Brother Kogyo Kabushiki Kaisha ( * ) Notice: Subject to any disclaimer, the term of this patent is extended or adjusted under 35 U.S.C. 154(b) by 1581 days.

(21) Appl. No.: 11/902,825

(22) Filed: Sep. 26, 2007

(65) Prior Publication Data
US 2008/0080001 A1 Apr. 3, 2008

(30) Foreign Application Priority Data

Sep. 29, 2006 (JP) ................................. 2006-267221

(51) Int. Cl.
G06K 15/00 (2006.01)
(52) U.S. Cl.
USPC ......................................... 358/1.14; 358/1.15
(58) Field of Classification Search ................ 358/1.14, 358/1.15
See application file for complete search history.

(56) References Cited

U.S. PATENT DOCUMENTS

| 5,077,795 A * | 12/1991 | Rourke et al. .................. 380/55 |
| 2003/0137680 A1 | 7/2003 | Maruoka |
| 2004/0109175 A1* | 6/2004 | Hatori et al. .................... 358/1.1 |
| 2004/0186925 A1* | 9/2004 | Cooper et al. ..................... 710/8 |
| 2005/0024677 A1* | 2/2005 | Miura et al. ................. 358/1.15 |
| 2006/0061813 A1* | 3/2006 | Kuroda et al. ............... 358/1.15 |

FOREIGN PATENT DOCUMENTS

| JP | 7-125391 | 5/1995 |
| JP | 11-215358 | 8/1999 |
| JP | 11-272432 | 10/1999 |
| JP | 2001-216113 | 8/2001 |
| JP | 2003-127473 | 5/2003 |
| JP | 2003-333226 | 11/2003 |
| JP | 2004-58500 | 2/2004 |
| JP | 2004-178418 | 6/2004 |
| JP | 2004-355116 | 12/2004 |
| JP | 2006-56109 | 3/2006 |
| JP | 2006-137137 | 6/2006 |
| JP | 2006-142615 | 6/2006 |

OTHER PUBLICATIONS

Japanese Office Action, with English translation issued in Japanese Office Action issued in Japanese Patent Application No. JP 2006-267221 dated on Jun. 5, 2008.

* cited by examiner

Primary Examiner — Benny Q Tieu
Assistant Examiner — Eric A Rust
(74) Attorney, Agent, or Firm — McDermott Will & Emery LLP

(57) ABSTRACT

One aspect of the present invention can include an image forming apparatus having an access portion configured to access an external storage medium, a file specification portion configured to specify a file to be a printing object, from files stored in the storage medium, a printing portion configured to execute, in accordance with printing conditions, data development processing of the file specified by the file specification portion and execute processing of printing to a printing medium on the basis of the developed data obtained by the data development processing, a printing history storage portion configured to store printing conditions used in the printing processing executed by the printing portion as printing history information. This aspect of the present invention can further include an acceptance portion configured to accept a printing history use instruction, and a printing control portion configured to, when the printing history use instruction is received and a file is specified by the file specification portion, cause printing processing of the specified file to be executed by the printing portion in accordance with the printing conditions stored as the printing history information.

8 Claims, 10 Drawing Sheets

IMAGE FORMING APPARATUS SPECIFYING A FILE TO BE PRINTED FROM FILES STORED IN A STORAGE MEDIUM

CROSS REFERENCE TO RELATED APPLICATION

This application claims priority from Japanese Patent Application No. 2006-267221 filed Sep. 29, 2006. The entire content of this priority application is incorporated herein by reference.

TECHNICAL FIELD

This disclosure relates to an image forming apparatus.

BACKGROUND

There has conventionally been an image forming apparatus provided with a direct printing function for directly acquiring a file from an external storage medium to print the file. In such an image forming apparatus, image data for which printing processing has already been performed and printing conditions (such as paper size and layout) used in the printing processing are stored in an external card as the external storage medium described above. When the image data is specified as a printing object again, printing processing is executed in accordance with the printing conditions stored in the storage medium in association with the image data. According to such a configuration, in the case of performing the re-specification after performing printing under other printing conditions, it is not necessary for a user to reset the printing conditions to those of the previous printing.

When performing the direct printing, the user may want to change only the file to be printed, for example, under the same printing conditions as the direct printing executed immediately before the direct printing. For example, in the case of files in the same file format, the user often wants to print them under the same printing conditions. However, since the conventional image forming apparatus is configured to store printing conditions for each printed file, there is a problem that, even when the user wants to perform direct printing of a different file under the same printing conditions as those of a printed file, it is necessary to reset the printing conditions by a setting portion after all if the different file has not been printed yet. Furthermore, since the configuration is such that printing conditions are stored for each file, there is a problem that a large amount of storage capacity is required.

SUMMARY

One aspect of the present invention can include an image forming apparatus having an access portion configured to access an external storage medium, a file specification portion configured to specify a file to be a printing object, from files stored in the storage medium, a printing portion configured to execute, in accordance with printing conditions, data development processing of the file specified by the file specification portion and execute processing of printing to a printing medium on the basis of the developed data obtained by the data development processing, a printing history storage portion configured to store printing conditions used in the printing processing executed by the printing portion as printing history information. This aspect of the present invention can further include an acceptance portion configured to accept a printing history use instruction, and a printing control portion configured to, when the printing history use instruction is received and a file is specified by the file specification portion, cause printing processing of the specified file to be executed by the printing portion in accordance with the printing conditions stored as the printing history information.

BRIEF DESCRIPTION OF THE DRAWINGS

Illustrative aspects in accordance with the invention will be described in detail with reference to the following figures wherein.

DETAILED DESCRIPTION OF THE PREFERRED ILLUSTRATIVE ASPECTS

An aspect of the present invention will be described with reference to FIGS. 1 to 7.

1. The Whole Configuration of a Printer

A printer 10 (an example of an "image forming apparatus") of this aspect is provided with a PC printing function for receiving print data from a host computer (not shown) or the like and printing the print data, and a direct printing function for directly reading image data (herein also referred to as "a file") stored in an external memory (for example, a USB memory 17 in this aspect) and printing the image data. As for the direct printing function, the printer 10 especially has a characteristic configuration as shown below.

Figure 1:
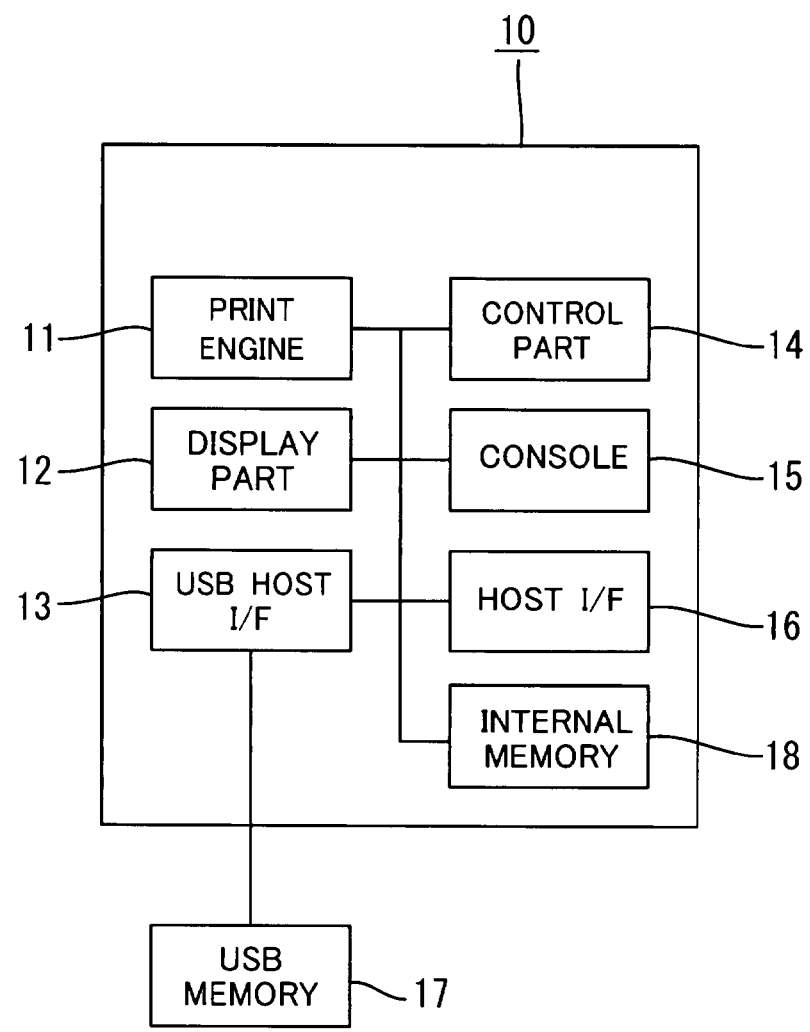
FIG. 1 is a simplified schematic diagram showing the hardware configuration of a printer according to an aspect of the present invention.

FIG. 1 is a simplified schematic diagram showing the hardware configuration of the printer 10. The printer 10 can include a printing engine 11 for performing an operation of printing onto paper 19 (an example of a "printing medium"), a display portion 12, a USB host I/F 13, a control portion 14, an operation portion 15 by which operations are performed by a user, a host I/F 16, and an internal memory 18. Program for controlling the operation of the whole printer 10 and the like can be stored in a printing processing area of the internal memory 18. The control section 14 can be provided with a CPU to control the operation of the printing engine 11 and the display section 12 on the basis of the programs stored in the internal memory 18. The printer 10 can perform data communication with the host computer via the host I/F 16. The USB memory 17 is detachably attached to the printer 10, and the control section 14 can access the USB memory 17 to read information in the USB memory 17 via the USB host I/F 13. In this case, the control section 14 functions as an "access portion".

2. The Memory Structure in the USB Memory 17

Figure 2:
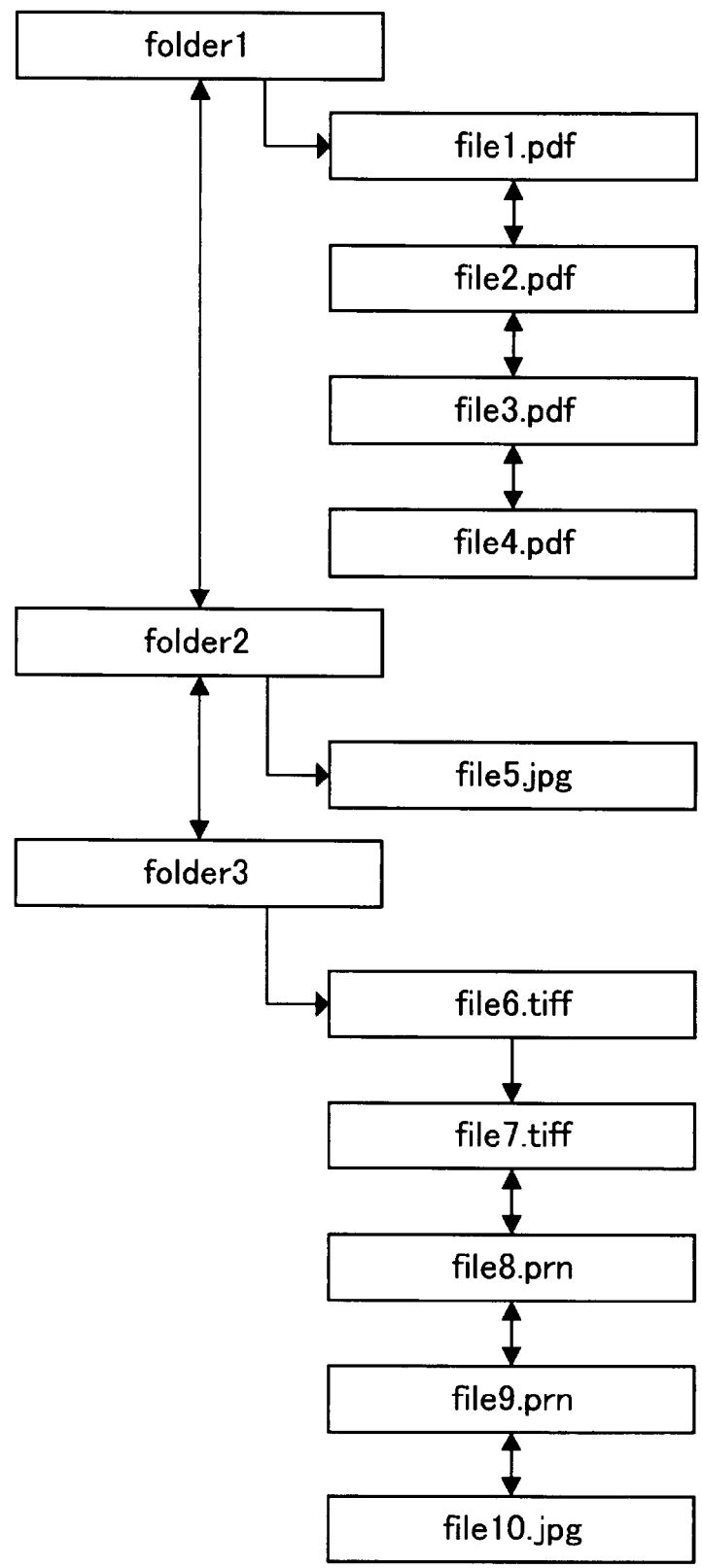
FIG. 2 is a conceptual diagram showing the memory structure in a USB memory.

In the USB memory 17, there is constructed a file system of a tree structure in which multiple directories are formed as a hierarchy, and multiple files (image data, text data or the like) are stored in folders (directories) created, for example, according to classifications based on the user's taste. In this aspect, for example, three folders (indicated as "folder 1", "folder 2" and "folder 3" in the figure) are stored in the USB memory 17 (an example of the "external storage medium 11") as shown in FIG. 2. In the folder 1 among these folders, four files ("file1.pdf", "file2.pdf", "file3.pdf" and "file4.pdf") in the format of PDF (Portable Document Format) are stored. In the folder 2, one file ("file5.jpg") in the format of JPEG (Joint Photographic Experts Group) is stored. In the folder 3, two files ("file6.tiff" and "file7.tiff") in the format of TIFF (Tagged Image File Format), two files ("file8.prn" and "file9.prn") in the printer file format, and a JPEG-format file ("file10.jpg") are stored.

3. Configuration of the Display Section and the Operation Portion

Figure 3:
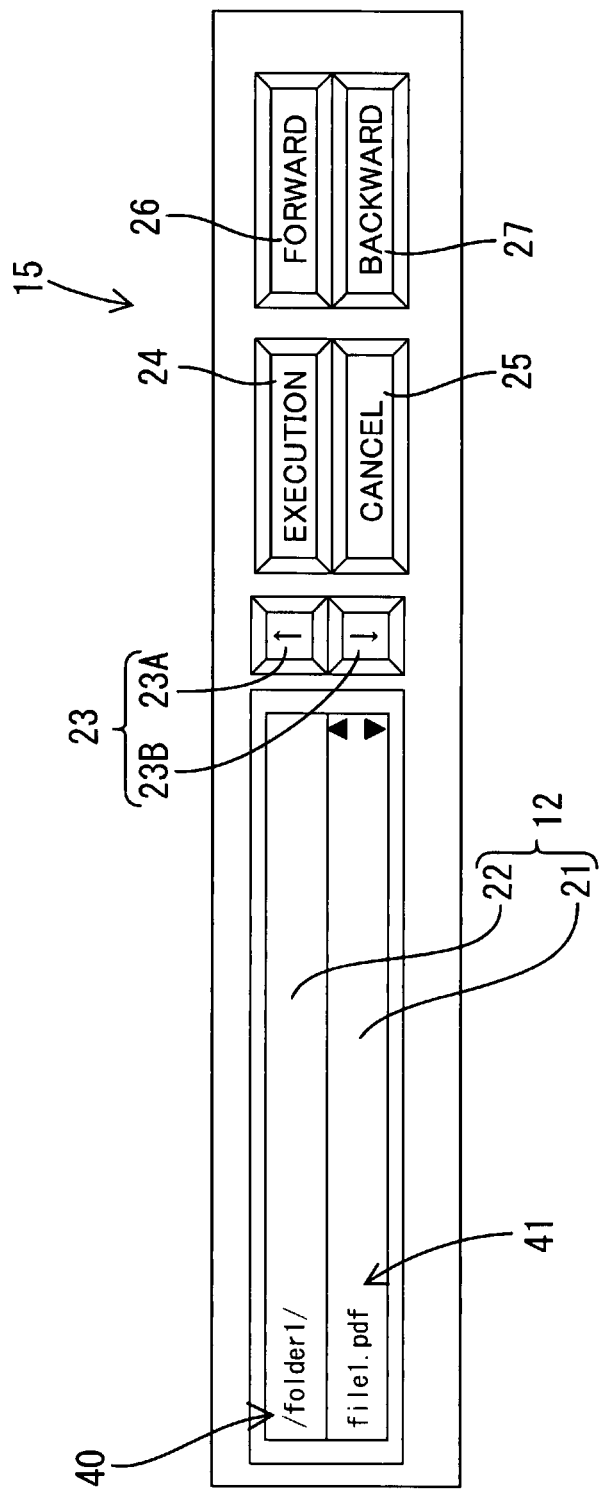
FIG. 3 is a schematic diagram showing an operation portion and a display portion arranged on the surface of the body case of the printer.

FIG. 3 is a schematic diagram showing the operation section 15 and the display section 12 arranged on the surface of the body case of the printer 10. The display section 12 is, for example, a liquid crystal display section in a two-screen configuration in which a first display portion 21 and a second display portion 22 are vertically arranged. On the second display section 22, a path name 40 indicating the position in the tree structure, of the folder which is an object to be displayed (processed) at present is displayed. On the first display section 21, filenames 41 (an example of "file identification information") of the files in the folder are displayed in a scrolling form. On the operation section 15, there are arranged an UP/DOWN switch 23 configured by an UP key 23A and a DOWN key 23B, an EXECUTION key 24, a CANCEL key 25, a FORWARD key 26, a RETURN key 27.

When the direct printing function is executed, the file which is currently displayed on the first display section 21 ("file1.pdf" in FIG. 3) can be specified as an object of direct printing, for example, by operating the FORWARD key 26 and the RETURN key 27 to move between a higher layer and a lower layer in the tree structure and then pressing the EXECUTION key 24. Here, multiple files can be specified as files subjected to direct printing. When specification of a file subjected to direct printing ends, it is necessary to set various printing conditions, for example, as shown below by operating the operation section 15.

(a) Paper size.

(b) Nin1 (specification of the number of image pages to be printed on one piece of paper 19).

(c) Direction of printing (specification of whether printing is performed with the longitudinal direction of the paper 19 as the vertical direction of the image or as the horizontal direction of the image).

(d) Specification of whether to perform both-side printing or one-side printing.

(e) Kind of print medium (specification of whether to use regular paper, special paper, plastic sheets, or the like).

(f) Specification of whether to use a discharge method of loading printed sheets on the paper discharge tray in a manner that pages for each copy are collected together (collate) or a method of loading printed sheets on the paper discharge tray in a manner that the same pages are collected together (stack), in the case of printing multiple copies.

(g) Selection and specification of a discharge tray in the case where multiple discharge trays are provided for the printer 10.

(h) Specification of whether to perform color printing or monochrome printing in the case where the printer 10 is a color printer.

(i) Specification of the image quality of an image to be printed, such as specification of resolution.

(j) Specification of the number of copies.

4. Printing History Use Function

To use the direct printing function, the first step can be to set various printing conditions as described above. It is troublesome to perform such a setting work every time the direct printing function is executed. Accordingly, the printer 10 of this aspect is provided with a printing history use function which makes it possible to store printing conditions used in direct printing executed once, in a printing history storage area (an example of a "printing history storage portion") in the internal memory 18 as printing history information and perform direct printing with the use of this printing history information. By using this printing history use function, it is possible to omit the work of setting various printing conditions described above. The execution of this printing history use function can be instructed by performing a predetermined operation on the operation section 15.

The contents of the control executed by the control section 14 will be described below with reference to FIGS. 4 and 5.

Figure 4:
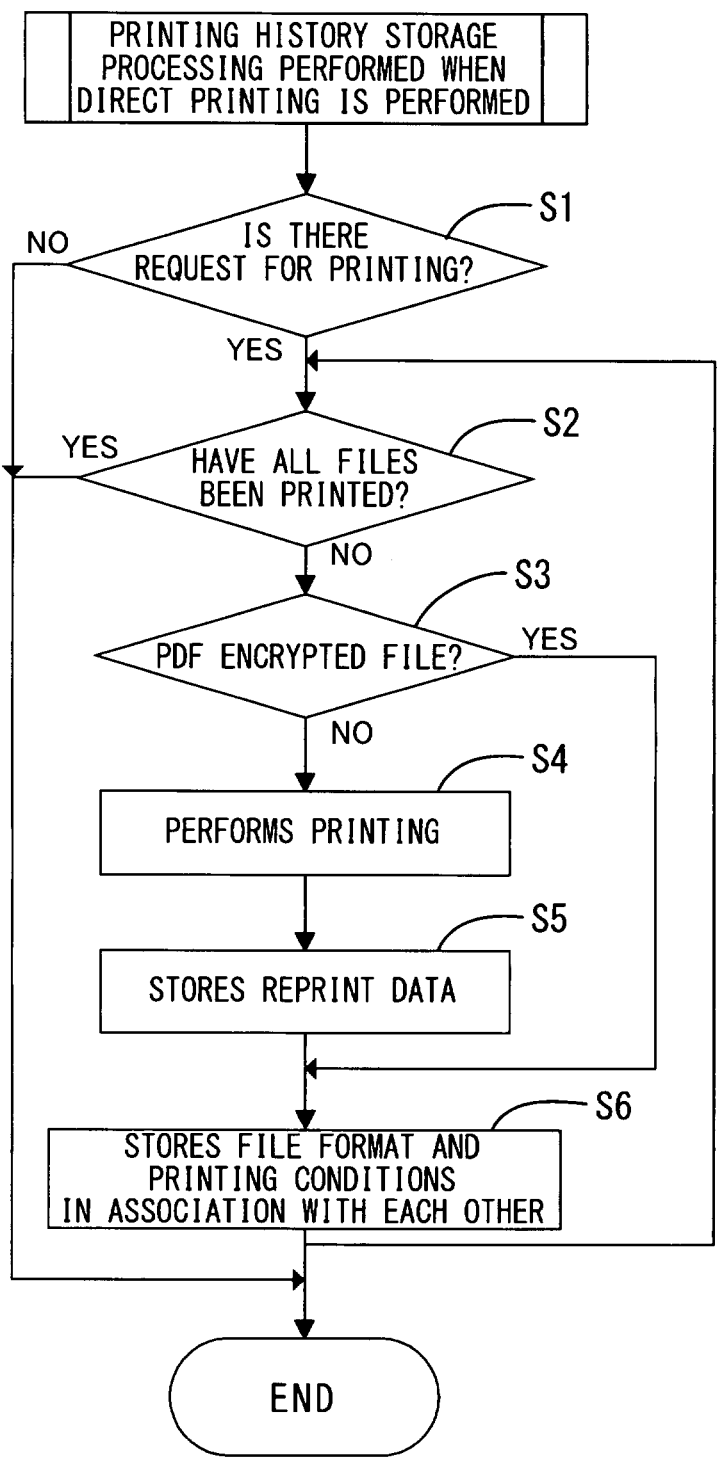
FIG. 4 is a flowchart showing printing history storage processing performed when direct printing is performed.

(1) Print History Storage Processing Performed when Direct Printing is Performed First, when the direct printing function is executed, the control section 14 determines whether there is a request for direct printing or not at S1 in FIG. 4. For example, by specifying files subjected to direct printing, finishing the work of setting each printing condition and pressing the EXECUTION key 24, as described above, it is assumed that a request for direct printing has been made (S1:Y). If all the object files are not printed (S2: N), it is determined whether each object file is an unprintable file or not at S3. In this case, the control section 14 functions as an "inhibition determination section".

In this aspect, it is determined whether each object file is an unprintable file or not depending on whether security is applied to the object file or not. More specifically, it is determined depending on whether the file is a PDF encrypted file or not. If the file is not a PDF encrypted file (S3: N), data development processing of this object file is performed (specifically, processing for development into bitmap data) in according with the printing conditions described above, and the developed data (hereinafter, this development data is referred to as "reprint data") is transferred to the printing engine 11 (S4). In response to this, the printing engine 11 prints an image corresponding to the received reprint data on the paper 19. In this case, the control portion 14 and the printing engine 11 function as a "printing portion".

The control section 14 stores this reprint data in a reprint data storage area of the internal memory 18 (S5) and stores the printing conditions used in the direct printing in the printing history storage area of the internal memory 18 in association with the file format of the object file (S6). Specifically, the printing conditions used in the direct printing last executed are stored in the printing history storage area of the internal memory 18, being classified according to the file format, such as PDF format, JPEG format, TIFF format and PRN format.

On the other hand, if the current object file is a PDF encrypted file (S3:Y), printing processing (S4) and storage of reprint data (S5) are not performed, and the printing conditions are stored in association with the PDF format as print history information (S6).

(2) Processing Performed when the Printing History Use Function is Executed.

Figure 5:
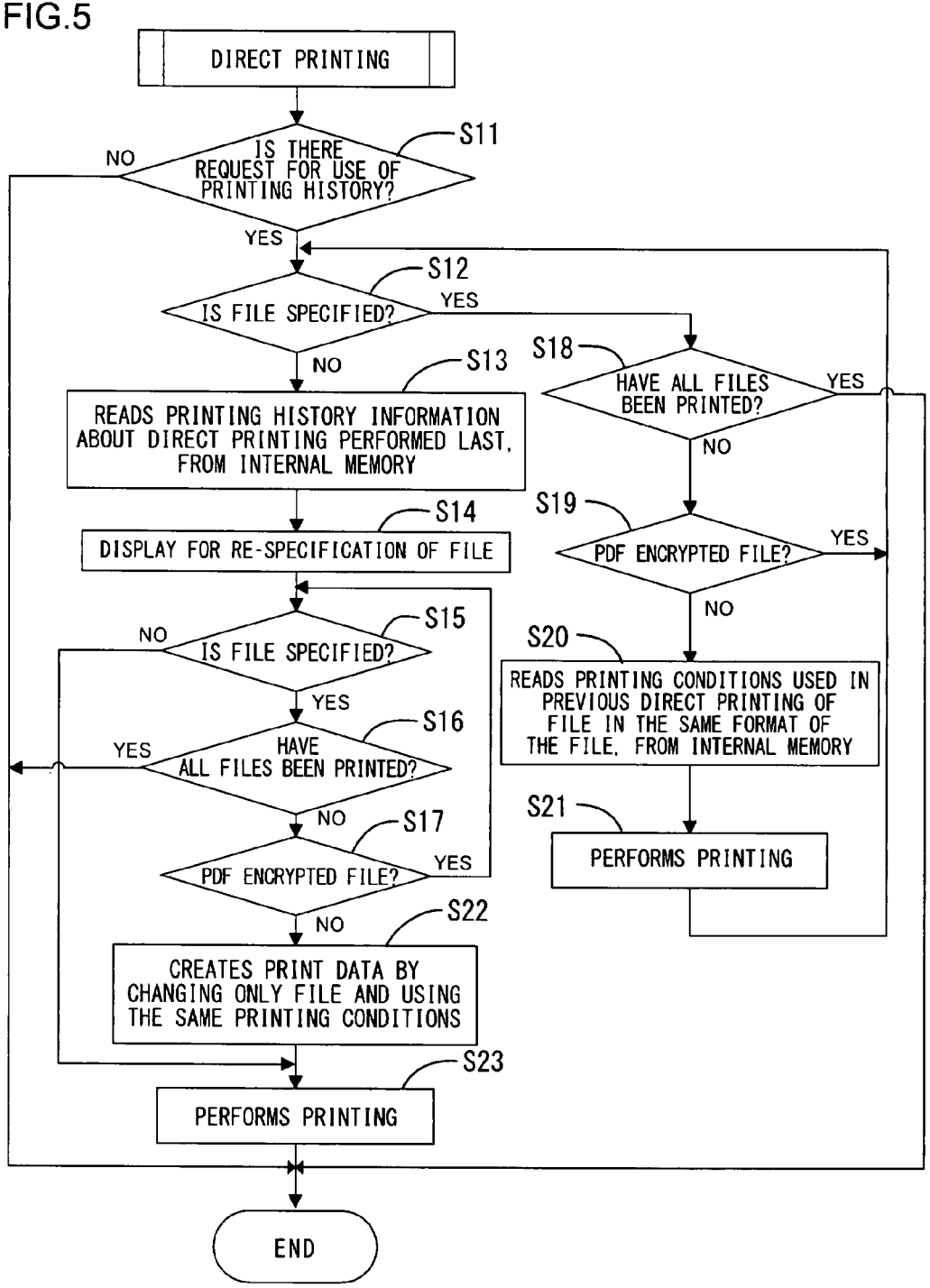
FIG. 5 is a flowchart showing direct printing processing.

When execution of use of the printing history is instructed (an example of a "print history use instruction") by the operation section 15, the control section 14 determines that there is a request for use of the printing history at S11 in FIG. 5 (S11: Y). In this case, the operation section 15 functions as an "acceptance portion". Next, the control section 14 causes a filename 41 and the like to be displayed on the display section 12, as shown in FIG. 3, so that a file subjected to direct printing can be newly specified by operating the operation section 15. In this case, the operation section 15 functions as a "file specification portion".

Then, if an operation which instructs that an object file is not newly specified is performed by the operation section 15 (S12: N), the printing history information stored when the latest direct printing (direct printing performed last) was performed is read from the internal memory 18 irrespective of the file format (S13). Then, the filename 41 and the like are displayed on the display section 12 again so that a file subjected to direct printing can be newly specified by operating the operation section 15 (S14). If the operation which instructs that an object file is not specified is performed here again (S15: N), this operation means that direct printing of the same file of the latest direct printing should be re-executed under the same printing conditions. In this aspect, since the reprint data of the latest direct printing is stored in the internal memory 18 as described before (S5 in FIG. 4), only the processing for transferring the reprint data to the printing engine 11 is executed without the data development processing being performed (S23).

If files are specified at S15 (S15: Y), and then printing processing has not ended for all the object files (S16: N), it is determined at S17 whether each object file is an unprintable file or not, similarly to S3 in FIG. 4. If the specified object file is a PDF encrypted file (S17: Y), the flow returns to S15 to cause file specification to be performed again. If the object file is not a PDF encrypted file (S17: N), the specified object file is newly acquired from the USB memory 17, and data development processing of this object file is executed in accordance with the printing conditions used in the latest direct printing (direct printing last performed). Then, the reprint data is transferred to the printing engine 11 (S23). Accordingly, when the same file of the latest direct printing is specified as an object file at S15, direct printing of the same file is also re-executed under the same printing conditions.

On the other hand, if a file different from the file of the latest direct printing is specified as an object file at S15, direct printing of the different file is re-executed under the same printing conditions used in the latest direct printing (direct printing performed last) (S22 and S23). In this case, the control section 14 functions as a "printing control section". A configuration is also possible in which the filename of an object file is also associated and stored as print history information together with printing conditions, and, when the same file of the latest direct printing is specified as an object file, reprint data stored in the internal memory 18 is used similarly to the case where the operation which instructs that a file is not specified is performed at S15.

If, at the first file specification (S12), an operation of specifying object files is newly performed (S12: Y), and then printing processing has not ended for all the object files (S18: N), it is determined whether each object file is an unprintable file or not at S19, similarly to S3 in FIG. 4. If the object file is a PDF encrypted file (S19: Y), the flow returns to S12 to cause file specification to be performed again. If the object file is not a PDF encrypted file (S19: N), printing history information for the same file format as that of the object file is read from the internal memory 18. Data development processing is executed in accordance with the printing conditions of this printing history information (S20), and the data is transferred to the printing engine 11 (S21). In short, direct printing of each object file can be executed under the same printing conditions used in the latest direct printing of a file in the same file format.

Figure 6A:
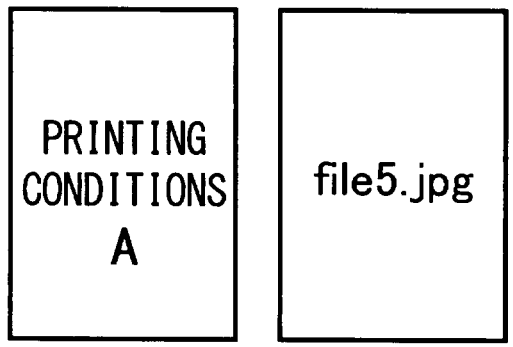
FIG. 6A is a schematic diagram illustrating printing history information (part1)
Figure 6B:
FIG. 6B is a schematic diagram illustrating printing history information (part2)

For example, if the object file is a JPEG-format file 5, and the printing conditions are printing conditions A, at the second previous direct printing, as shown in FIG. 6A, then the printing conditions A are stored in association with the JPEG format, as printing history information. Subsequently, if the object files are a TIFF-format file 6, a PDF-format file 1 and a PDF-encrypted-format-file 4, and the printing conditions are printing conditions B, at the previous direct printing, as shown in FIG. 6B, then the printing conditions B are stored in association with each of the TIFF-format and the PDF-format, as printing history information.

Then, the printing history use function is executed. If, as shown in the pattern 1 in FIG. 7A, the same object files of the previous direct printing are newly specified at S12 or S15 in FIG. 5 (S12: Y or S15: Y in FIG. 5), then the files 1, 4 and 6 are read from the USB memory 17 again, and reprint data is generated in accordance with the printing conditions B for the unencrypted files 1 and 6.

Figure 7A:
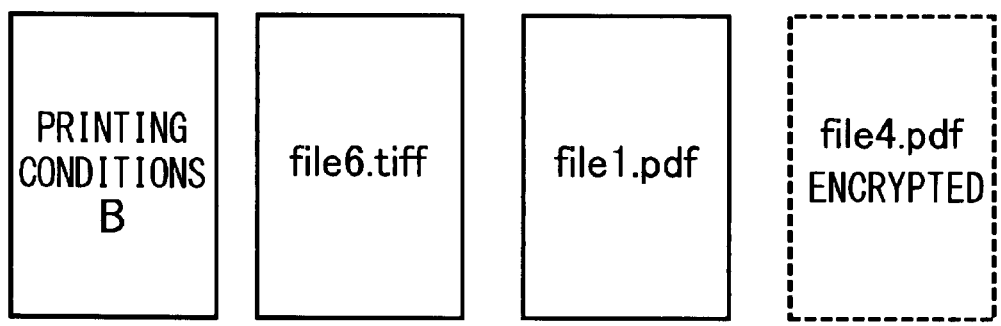
FIG. 7A is a schematic diagram showing the printing history use pattern 1.
Figure 7B:
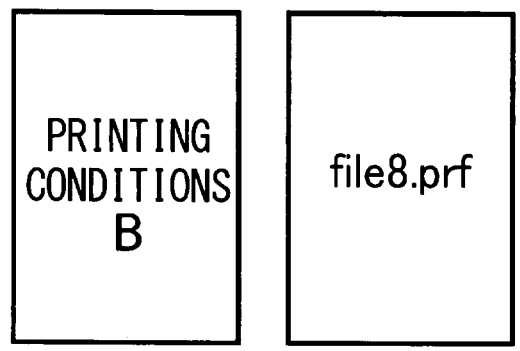
FIG. 7B is a schematic diagram showing the printing history use patterns 2.

If, as shown in the pattern 2 in FIG. 7B, a PRN-format file 8 is newly specified as an object file at S12 in FIG. 5 (S12: Y in FIG. 5), and printing history information corresponding to this PRN format is not stored yet, then reprint data is generated, for example, in accordance with the printing conditions used in the latest direct printing (direct printing performed last) (the printing conditions B used in the previous direct printing, according to the example in FIG. 6).

If the PRN-format file 8 is newly specified at S15 in FIG. 5 (S15: Y in FIG. 5), then reprint data is generated in accordance with printing conditions used in the latest direct printing (direct printing performed last) (the printing conditions B used in the previous direct printing, according to the example in FIG. 6), irrespective of whether printing history information corresponding to this PRN format is stored or not.

Figure 7C:
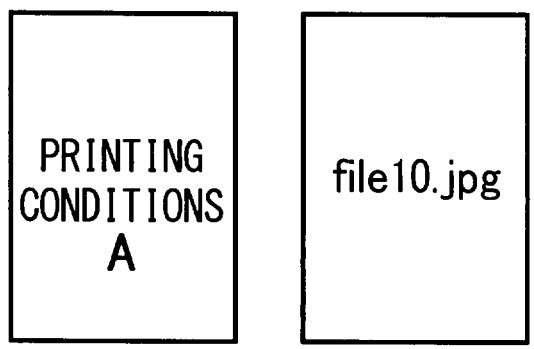
FIG. 7C is a schematic diagram showing the printing history use patterns 3.

Furthermore, if, as shown in the pattern 3 in FIG. 7C, a JPEG-format file 10 is specified as an object file at S12 in FIG. 5 (S12: Y in FIG. 5), then reprint data is generated in accordance with the printing conditions A of the printing history information corresponding to the JPEG format because the printing history information is already stored.

On the other hand, according to the example in FIG. 6, though the history information about the second previous direct printing is the printing conditions A corresponding to the JPEG format, reprint data is generated in accordance with the printing conditions used in the latest direct printing (direct printing performed last) (the printing conditions B used in the previous direct printing according to the example in FIG. 6) if the JPEG-format file 10 is specified as an object file at S15 in FIG. 5 (S15: Y in FIG. 5).

5. Advantages of this Aspect (1) According to this aspect, it is possible to store printing conditions used in direct printing executed once, in the printing history storage area of the internal memory 18 as printing history information, and then perform direct printing with the use of this printing history information. Therefore, by using this printing history use function, it is possible to omit the work of setting various printing conditions.

(2) It is possible to inhibit printing of a file which should not be printed, for example, a confidential file.

(3) Even when a file different from files which have already been directly printed is specified as an object file, it is possible to use the printing conditions corresponding to the same file format of the specified object file if a file in the same file format as the specified object file has already been directly printed. Furthermore, in the case of wanting to execute direct printing of the same file of the latest direct printing under the same printing conditions used in the latest direct printing, reprint data which has already stored in the internal memory 18 is used, and therefore, the printing processing load can be reduced and the speed can be increased.

<Other Aspects>

The present invention is not limited to the aspect explained in the above description and the drawings. For example, the following aspects are also included in the technical scope of the present invention.

(1) In the above aspect, when the reprint data of the latest direct printing is stored in the internal memory 18 (S5 in FIG. 4), and a user wants to re-execute direct printing of the same file of the latest direct printing under the same printing conditions used in the latest direct printing, the reprint data stored in the internal memory 18 is used (S15: N in FIG. 5). However, such a configuration is also possible in which the reprint data of the latest direct printing is not stored in the internal memory 18 but is discarded, and, at the time of using printing history, reprint data is newly generated by re-acquiring an object file from the USB memory 17 even if the object file is the same. According to this configuration, the necessity of storing reprint data is eliminated. Therefore, the storage area (work area) of the internal memory can be released for other processings, after execution of the latest direct printing until execution of printing processing. Basically, a configuration is also possible in which reprint data is stored and used, and, in the case of lack of the capacity of the internal memory 18, a file in an external memory is read again.

(2) As the file identification information, a pathname may be also used, in addition to a filename 41.

(3) In the above aspect, whether or not a file is an encrypted file, such as a PDF encrypted file, is determined as an inhibition condition. In addition, for example, a configuration is also possible in which whether or not a file is an encrypted file is determined on the basis of whether or not characters indicating inhibition of printing, such as "Confidential" and "For in-company use only", are included in the filename or information in the file. In this case, it is desirable that the inhibition condition to be a criterion of determination about whether or not to inhibit printing (for example, a particular file format, and particular characters/symbols included in a filename or data in a file) can be changeably set with the use of the operation section 15 and the display section 12 (an example of "an inhibition condition setting section".

(4) In the above aspect, printing conditions of printing history information corresponding to each file format are selected and used. However, this is not limiting. For example, a configuration is also possible in which the filename (except the extension) of an object file is also stored as printing history information, and the printing conditions of the printing history information corresponding to a filename which includes the same characters or symbols as those of the filename of the object file of the direct printing this time are used.

(5) A configuration is also possible in which the printing history information is stored not in the internal memory 18 but in the USB memory 17. That is, the configuration is such that the printing history information about a file stored in the USB memory 17 is stored in the USB memory 17, and the control section 14 on the printer 10 side also reads the printing history information. Thereby, the printing history information about a file stored in each external memory can be managed by the external memory itself.

(6) A configuration is also possible in which the filename of an object file is also stored as printing history information; the processing flow proceeds to S18 if a file with a filename different from the printing history information is specified as an object file at S12 in FIG. 5; and the processing flow proceeds to S13 if a file with the same filename is specified as an object file.

(7) A configuration is also possible in which, if the printing history use function is executed, and the printing conditions of printing history information are read, then the printing conditions are displayed as default values on the display section 12, and direct printing can be executed after changing a part of the printing condition by operating the operation section 15.

(8) It is also possible to set whether or not to execute the printing history storage processing when direct printing is performed, independently from the reprint function (for storing only reprint data) executed when PC printing is performed.

(9) The file specification section not only specifies a file directly but also can specify a folder to collectively specify the files in the folder.

(10) The "image forming apparatus" is not limited to a printing apparatus such as a printer (for example, a laser printer), and it may be a facsimile apparatus or a complex machine provided with a printer function, a reading function (scanner function), and the like. The "printing medium" is not limited to a paper printing medium such as paper. It may be a plastic printing medium such as an OHP sheet.

What is claimed is:

1. An image forming apparatus comprising:
an access device configured to access an external storage medium;
a file specification device configured to specify a file to be printed, from files stored in the storage medium;
a printing device configured to print developed data on a printing medium;
an acceptance device configured to accept a printing history use instruction;
a memory device configured to store printing conditions and file identification information that identifies a file to be printed as printing history information, the file identification information being associated with the printing conditions; and
a control device configured to, upon receiving a printing request:
determine whether the file to be printed is specified by the file specification device and determine whether the printing history use instruction is accepted by the acceptance device;
control the printing device to create the developed data from the file specified by the file specification device in accordance with the printing conditions and to print the developed data, if the control device determines that the file is specified by the file specification device and the printing history use instruction is accepted by the acceptance device; and
control the printing device to create the developed data from the file identified by the file identification information in accordance with the printing conditions and to print the developed data, if the control device determines that the file is not specified by the file specification device and the printing history use instruction is accepted by the file acceptance device.

2. The image forming apparatus according to claim 1, wherein:
multiple pieces of the printing history information are stored in the memory device, the multiple pieces of the printing history information being associated with file formats of files for which the developed data are created, respectively, and
when the file is specified by the file specification device and the printing history use instruction is accepted by the file acceptance device, the control device is configured to control the printing device to create the developed data in accordance with the printing conditions for a file having a same file format of the specified file.

3. The image forming apparatus according to claim 2, wherein
when the file is specified by the file specification device and the printing history use instruction is accepted by the file acceptance device, the control device is configured to control the printing device to create the developed data in accordance with the printing conditions for a file having file identification information at least a part of which is common to identification information about the specified file.

4. The image forming apparatus according to claim 2, further comprising
an inhibition determination device configured to determine if the file specified by the file specification device satisfies a set inhibition condition, wherein
the control device is configured to control the printing device not to create a file determined to satisfy the inhibition condition, by the inhibition determination device.

5. The image forming apparatus according to claim 1, wherein:
multiple pieces of the printing history information are stored in the memory device, the multiple pieces of the printing history information being associated with pieces of identification information about files for which the developed data are created, respectively, and
when the file is specified by the file specification device and the printing history use instruction is accepted by the file acceptance device, the control device is configured to control the printing device to create the developed data in accordance with the printing conditions for a file having file identification information at least a part of which is common to identification information about the specified file.

6. The image forming apparatus according to claim 5, further comprising
an inhibition determination device configured to determine if the file specified by the file specification device satisfies a set inhibition condition, wherein
the control device is configured to control the printing device not to create a file determined to satisfy the inhibition condition, by the inhibition determination device.

7. The image forming apparatus according to claim 1, further comprising
an inhibition determination device configured to determine if the file specified by the file specification device satisfies a set inhibition condition, wherein
the control device is configured to control the printing device not to create a file determined to satisfy the inhibition condition, by the inhibition determination device.

8. The image forming apparatus according to claim 7, further comprising an inhibition condition setting device configured to set the inhibition condition.

* * * * *